(No Model.)
J. A. BARRETT.
ELECTRIC BATTERY.
No. 374,862. Patented Dec. 13, 1887.
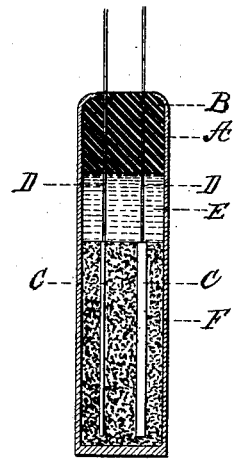
WITNESSES:
Gabriel J. W. Galster.
Wm. A. Cahil
INVENTOR
John A. Barrett
BY
Townsend MacArthur
ATTORNEYS

UNITED STATES PATENT OFFICE.

JOHN A. BARRETT, OF BROOKLYN, NEW YORK.

ELECTRIC BATTERY.

SPECIFICATION forming part of Letters Patent No. 374,862, dated December 13, 1887.

Application filed August 30, 1887. Serial No. 248,251. (No model.)

*To all whom it may concern:*

Be it known that I, JOHN A. BARRETT, a citizen of the United States, and a resident of Brooklyn, in the county of Kings and State of New York, have invented certain new and useful Improvements in Electric Batteries, of which the following is a specification.

In constructing electric batteries great difficulty has heretofore been experienced in sealing the same so as to prevent "creeping" of the battery-liquids. This difficulty has been especially great in the case of chloride-of-silver batteries.

The object of my invention is to provide a simple and effective seal for electric batteries, but more especially for chloride-of-silver batteries, and also to improve the chloride-of-silver battery so that the same shall be more conveniently transportable, as well as highly efficient and constant in action.

To these ends my invention consists, broadly, in the combination, with the battery, of a compound seal formed in two parts, one of which is formed of a mass of material of a sticky adherent nature surrounding the battery wires or connectors within the battery, but above the battery elements, which material, while sufficient by its adherent nature to effectually prevent creeping of the battery-fluid, is still insufficient, by reason of its lack of solidity, to alone form a seal, especially when subjected to the pressure of gases evolved within the battery, while the other part of the seal located above the first is a solid stopper, chosen not particularly with reference to its effectiveness in preventing creeping, but as a means for retaining the adherent material, which, in order to best perform its function, is in a viscous or semi-fluid condition.

For the first part of the seal any adherent or sticky material which by adhering to the battery-wires and the sides of the jar or cell will prevent the battery-fluid from creeping past will serve the purpose; and I have obtained good results from the employment of resin mixed by heat with sufficient oil to make it viscous or semi-fluid in nature. Resin alone will not form a seal, because if allowed to harden into its natural condition it will not be sufficiently adherent to the battery-wires, although in its solid condition it serves very well as an ordinary stopper. The same I found to be the case with paraffine, sealing-wax, and similar materials when I attempted to employ them alone as a seal. Their solidity was sufficient to give them the quality of an ordinary stopper and to prevent the battery material from flowing out freely; but they were inefficient against the phenomenon of creeping.

The solid portion of my compound seal I may make of sealing-wax, which is applied in obvious manner by heating it and then allowing it to set or harden over the viscous or semi-fluid seal against creeping. Other solid stoppers, such as are efficient in the case of ordinary liquids, might be employed to prevent the first portion of the seal from flowing out of position by the influence of the evolved gases or otherwise. The battery-wires must, however, pass through the solid portion of the seal, and I hence prefer to employ a material similar to sealing-wax, in so far as it can be made plastic, and then applied and allowed to set or harden in position. I therefore propose, also, to employ plaster-of-paris or other cements for the solid portion of the seal, as also paraffine, although the latter is ordinarily so soft as to require additional means for holding it in place. I have employed, also, sand, into which hot wax, paraffine, resin, or other cementing material is poured after the sand is placed in position over the adherent or gummy material.

In connection with a plug or stopper formed as above described, I propose to reduce the battery material to pasty, viscous, or gelatinous condition by mixing the active chemical with a proper material—as, for instance, a paste composed of flour. Other material besides flour might be employed. By this danger of displacement of the viscous or semi-fluid seal is largely avoided, and the proper application of such portion of the seal is more readily effected.

In the accompanying drawing I have shown in vertical section a chloride-of-silver battery containing my invention.

A indicates the battery-cell, formed of a glass vial having a contracted mouth in order to better hold the cement stopper B, forming the solid portion of the seal, and consisting, for instance, of sealing-wax.

C C indicate the battery-plates, and D D indicate the battery wires or connectors which pass through the mouth of the cell and are embedded in the wax B, as well as in the sticky, gummy, or adherent semi-fluid material indicated at E below the stopper B.

F indicates a mass of paste or other viscous or gelatinous material which surrounds the battery-plates, and which in a chloride-of-silver battery I propose to charge with sulphate of zinc. The charged mass F may be conveniently formed of a paste of wheat or other flour made from mixing the flour with a solution of the sulphate of suitable strength. From a chloride-of-zinc battery made in this way I have obtained excellent results in the way of longevity, combined with uniformity of current during the life of the battery. The chloride of silver is applied in any desired way.

I do not claim the use of sulphate of zinc in a chloride-of-silver battery, as this forms the subject of another application for patent previously filed by me, June 20, 1885, Serial No. 169,286.

What I claim as my invention is—

1. A seal for an electric battery, consisting of a mass of adherent or sticky material in a viscous or semi-fluid condition, in which the battery-wires are embedded, and a superimposed solid stopper, as and for the purpose described.

2. A seal for an electric battery, consisting of a mass of adherent or sticky material surrounding the battery wires or conductors, and a superimposed stopper of sealing-wax or equivalent cementing material, as and for the purpose described.

3. A compound seal or stopper for an electric battery, composed of a mass of resin or pitch mixed with oil and a superimposed stopper of a cementing material.

4. In an electric battery, the combination, with the gummy packing surrounding the battery-wires above the elements, of an external plug composed of a cementing material, as and for the purpose described.

5. In an electric battery, the combination of a sealing material formed of a semi-fluid or fluid material and battery elements immersed in a pasty or viscous mass with which the battery chemicals are combined, as and for the purpose described.

6. In a chloride-of-silver battery, battery-plates immersed in a viscous or gelatinous material charged with sulphate of zinc.

7. In a chloride-of-silver battery, the combination, with the battery-plates, of a flour paste containing sulphate of zinc.

Signed at New York, in the county of New York and State of New York, this 24th day of August, A. D. 1887.

JOHN A. BARRETT.

Witnesses:
WM. H. CAPEL,
HUGO KOELKER.